United States Patent
Sanderson et al.

(10) Patent No.: US 8,733,130 B2
(45) Date of Patent: May 27, 2014

(54) PRODUCTION OF COATED GLASS

(75) Inventors: Kevin Sanderson, Skelmersdale (GB);
Gerhard Lingl, Weiherhammer (DE);
Hans-Eckhard Leitl, Weiden (DE);
Franz Michael Josef Scharnagl,
Weiden (DE); Douglas M Nelson,
Curtice, OH (US)

(73) Assignee: Pilkington Group Limited, St. Helens (GB)

( * ) Notice: Subject to any disclaimer, the term of this patent is extended or adjusted under 35 U.S.C. 154(b) by 337 days.

(21) Appl. No.: 12/736,730

(22) PCT Filed: May 7, 2009

(86) PCT No.: PCT/GB2009/050479
§ 371 (c)(1),
(2), (4) Date: Dec. 16, 2010

(87) PCT Pub. No.: WO2009/136201
PCT Pub. Date: Nov. 12, 2009

(65) Prior Publication Data
US 2011/0083472 A1 Apr. 14, 2011

(30) Foreign Application Priority Data
May 8, 2008 (GB) .................................. 0808338.8

(51) Int. Cl.
*C03C 17/34* (2006.01)
*C03C 17/36* (2006.01)
*C03C 17/00* (2006.01)

(52) U.S. Cl.
CPC ............ *C03C 17/3655* (2013.01); *C03C 17/002* (2013.01); *C03C 17/366* (2013.01); *C03C 2218/112* (2013.01); *C03C 2218/152* (2013.01)
USPC .......... 65/90; 65/95; 65/97; 65/99.1; 65/99.2; 65/60.1; 65/60.5; 65/60.53

(58) Field of Classification Search
CPC  C03C 17/3655; C03C 17/002; C03C 17/366; C03C 2218/112; C03C 2218/152

USPC ............ 65/90, 95, 97, 99.1, 99.2, 60.1, 60.5, 65/60.53

See application file for complete search history.

(56) References Cited

U.S. PATENT DOCUMENTS

| | | | | |
|---|---|---|---|---|
| 3,885,066 A | * | 5/1975 | Schwenninger | ............... 427/314 |
| 3,914,118 A | | 10/1975 | Brooke et al. | |
| 3,970,037 A | * | 7/1976 | Sopko | ............................ 118/729 |
| 4,100,330 A | * | 7/1978 | Donley | ............................ 428/429 |
| 4,946,712 A | | 8/1990 | Goodman et al. | |
| 5,798,142 A | | 8/1998 | Soubeyrand | |
| 2008/0070045 A1 | | 3/2008 | Barton et al. | |
| 2009/0046355 A1 | * | 2/2009 | Derda | ............................ 359/359 |
| 2009/0133442 A1 | | 5/2009 | Bretschneider | |
| 2010/0024875 A1 | * | 2/2010 | Fukui et al. | ..................... 136/256 |
| 2010/0246009 A1 | * | 9/2010 | Polley et al. | .................. 359/578 |

FOREIGN PATENT DOCUMENTS

| | | |
|---|---|---|
| EP | 0 785 868 B1 | 9/2001 |
| FR | 2 240 893 A1 | 3/1975 |
| JP | 2008030982 A | 2/2008 |
| WO | WO 2006/043026 A1 | 4/2006 |
| WO | WO 2007/039082 A1 | 4/2007 |

* cited by examiner

*Primary Examiner* — Queenie Dehghan
(74) *Attorney, Agent, or Firm* — Marshall & Melhorn, LLC

(57) ABSTRACT

A process for coating a ribbon of float glass is disclosed. It comprises the steps of forming a glass ribbon, depositing a first transparent conductive coating upon a major surface of the ribbon which does not extend to the edges of the ribbon while the ribbon is at an elevated temperature, cooling said coated ribbon under controlled conditions in an annealing lehr and cutting off the edges of the ribbon so as to produce a ribbon having a uniform coating extending across the full width of the cut ribbon which is characterized in that a second conductive coating is deposited upon the uncoated edges of the ribbon while that edge is at a temperature which is above the ambient temperature. The invention finds particular application in the production of coated glass products where the thickness of the glass ribbon is at least 8 mm and most particularly where the thickness of the glass is at least 10 mm.

15 Claims, No Drawings

PRODUCTION OF COATED GLASS

BACKGROUND OF THE INVENTION

This invention relates to novel processes for the production of coated glass during a float glass production process.

The float glass process, developed by Pilkington in 1952, is now the world standard for high quality glass production. Float glass is often processed further before being fitted into buildings and vehicles.

The process is used to make glass as thin as 0.4 mm and as thick as 25 mm. A 'batch' of precisely mixed raw materials is melted in a furnace. Molten glass, at approximately 1000° C., is poured continuously from the furnace onto a shallow bath of molten tin in a chemically controlled atmosphere. The glass floats on the tin, spreads out and forms a level surface. Thickness is controlled by the speed at which the solidifying glass ribbon is drawn off from the bath. The ribbon of glass which is produced is passed to a lehr in which it cools under controlled conditions. After annealing the glass emerges as a 'fire' polished product with virtually parallel surfaces.

The heat and light transmission properties of the glass may be varied by depositing a transparent coating upon at least one surface of the glass ribbon. These coatings may be deposited during the float glass production process. The processes which are used to deposit such coatings are commonly termed on line coating processes. Such processes are well established in commercial production and may be carried out using atmospheric pressure chemical vapour deposition processes (hereinafter for convenience APCVD processes). In an APCVD process a fluid mixture is directed onto the surface of the glass ribbon at a point where the ribbon is at an elevated temperature and the heat of the glass causes the reaction of the components of the fluid mixture and the deposition of a coating upon the surface of the glass ribbon. Such processes are particularly useful in the float bath. The float bath is maintained under a reducing atmosphere in order to avoid oxidation of the tin and is maintained at substantially atmospheric pressure. The glass is at a high temperature typically from 750° C. to 400° C.

Such processes may be carried out using known methods and apparatus such as those which are described in EP 785868. The apparatus typically comprises one or more distributor beams which extend transversely across the float bath section. The processes are designed to coat the entire width of the glass ribbon and the distributor beams are typically represented as extending across the entire width of the ribbon. However in practice the distributor beams do not extend to the edges of the ribbon because of the potential for the components of the fluid mixture to react with and/or contaminate the tin in the float bath. The extremities of the ribbon are left uncoated and are cut off after the ribbon leaves the annealing lehr.

One problem which is commonly encountered in a float glass production process is the breakage of the glass ribbon as it passes through the annealing lehr. These breakages are unpredictable events which reduce the yield of usable glass and which detract from the economics of the process. They occur during the production of uncoated glass possibly because the extremities of the ribbon, which are often termed the knurl, are thinner than the centre of the ribbon which leads to thermal and mechanical stresses in the ribbon. The problem of breakages in the ribbon is exacerbated when a coated glass ribbon is produced. The rate of heat loss in the ribbon is greater in the uncoated edges of the ribbon than in the coated section of the ribbon. This results in a temperature differential between these two portions of the ribbon as it passes through the annealing lehr which causes a thermal stress which can result in breaking of the ribbon which is undesirable.

Attempts have been made to reduce the number of breakages by providing heating means to raise the temperature of the uncoated edges of the ribbon. These attempts have not been entirely successful particularly when the coated section of the glass ribbon has a thickness of greater than 4 mm.

SUMMARY OF THE INVENTION

We have now discovered that this problem of breakages in the annealing lehr may be alleviated by depositing a layer comprising a conductive material on to the uncoated edges of the glass ribbon. Thus from a first aspect this invention provides a process for the production of a coated glass ribbon which comprises the steps of forming a glass ribbon, depositing a first transparent conductive coating upon a major surface of the ribbon which does not extend to the edges of the ribbon whilst the ribbon is at an elevated temperature, cooling said coated ribbon under controlled conditions in an annealing lehr and cutting off the edges of the ribbon so as to produce a ribbon having a uniform coating extending across the full width of the cut ribbon which is characterised in that a second conductive coating is deposited upon the uncoated edges of the ribbon whilst that edge is at a temperature which is above the ambient temperature. The temperature of the glass ribbon at the point where the edge coating is applied is preferably at least 300° C., more preferably at least 400° C. and most preferably at least 500° C. Applying the edge coating at an elevated temperature means that the ribbon has cooled less and is thereby less stressed. The edge coating may also be deposited more easily and rapidly at these temperatures. The temperature of the ribbon when it emerges from the float bath is generally approximates to 600° C. and as depositing the second edge coating in the float bath risks contamination of the bath it is preferred to deposit the second edge coating after the ribbon has emerged from the float bath. In a preferred embodiment the second coating is deposited as the ribbon passes across the gap between the float bath and the annealing lehr. The second coating may also be deposited whilst the ribbon is in the annealing lehr

DETAILED DESCRIPTION OF THE INVENTION

APCVD processes have been used to deposit a variety of oxides onto the glass ribbon during a float glass process. Multilayer coatings are deposited using a plurality of distributor beams within the float bath. The provision of a plurality of coating beams also enables the thickness of the coating or of an individual layer within a coating to be increased.

Coated glasses produced in this way exhibit a variety of properties including in particular thermal insulation properties, solar control properties, self cleaning properties and anti reflection properties. Coatings which are electrically conductive may be deposited in this way and these coated products find use in a variety of applications including CRT and flat screen panel displays and heated glass products such as refrigerator doors.

The application of a coating reduces the rate of heat loss compared to that of the uncoated glass at the edges of the ribbon. This is particularly true of low emissivity coatings which are designed to reflect long wavelength infra red radiation. The emissivity of float glass is approximately 0.84 whereas the emissivity of glass having a low emissivity coating is typically in the range 0.15 to 0.25. The emissivity, $\epsilon$, of a particular coating refers to the tendency of that coating to absorb and radiate energy, as compared to a blackbody which is a perfect radiator and is defined as having an emissivity of unity ($\epsilon=1$). The emissivity varies with the wavelength of the radiation and the declared value is an average over a range of wavelengths typically from 5 to 55 microns. A low emissivity coating, as referred to throughout this specification, is a poor absorber and radiator of longer wavelength thermal energy and has $\epsilon<1$.

In the processes of this invention the edge coating is preferably a coating whose emissivity is of a similar value to that of the coated glass in the centre of the ribbon. The coating at the edge of the ribbon may be the same as the coating at the centre but normally for reasons of economy and practicality it will not be identical. For example the provision of a multi-layer coating may be expensive and may be impractical. Furthermore APCVD processes employ the heat of the glass to drive the deposition reaction and when the temperature of the glass is lower the coating formed may not be identical to one which is deposited by the same reaction when the glass is at a higher temperature.

The thickness of the coating at the edge of the glass ribbon may be varied so as to provide the coated edges of the glass ribbon with an emissivity which is closer to that of the coated glass in the centre of the ribbon. The coating and its thickness will preferably be such that the emissivity of the coated edges of the ribbon is reduced from 0.8 to a value which is in the range 0.2 to 0.7.

A wide variety of conductive transparent coatings have been applied to glass substrates and any of these are potentially useful to coat the edges of the ribbon in the processes of the present invention. One group of such coatings comprise metal oxides and doped metal oxides such as fluorine doped tin oxide, tin oxide, antimony doped tin oxide, indium oxide, zinc oxide, indium tin oxide (ITO), aluminium doped zinc oxide and gallium doped zinc oxide.

Multilayer coatings comprising more than one of these materials in which the thickness of the layers is controlled provide the coated glass with a variety of useful properties. Such products are available in the market place and are commonly referred to as hard coated products. This distinguishes them from so called soft coated products which are produced by off line coating processes such as vacuum sputtering.

These edge coating can be deposited using known processes and known chemistries. For example tin oxide coating may be deposited by an APCVD process using systems such as tin tetrachloride and water, tin tetrachloride a lower alcohol and water, dimethyl tin dichloride and water, dimethyl tin dichloride and water and oxygen, mono butyl tin trichloride and water and oxygen or mono butyl tin trichloride and ethyl acetate and oxygen. Fluorine doped tin oxide coatings may be deposited by introducing a volatile fluorine precursor such as hydrofluoric acid, trifluoroacetic acid or hexafluoropropylene oxide into an APCVD process for the deposition of tin oxide. Preferred chemistries for the deposition of a fluorine doped tin oxide coating include monobutyl tin trichloride, ethyl acetate and hydrofluoric acid and stannic chloride, methanol, water and hydrofluoric acid. Zinc oxide coatings may be deposited using volatile organozinc compounds such as dimethyl zinc, diethyl zinc and zinc sec butoxide with esters such as ethyl acetate or with oxygen.

Another known type of process which may be used is a spray coating system in which a liquid comprising a precursor of the metal is sprayed on to the surface of the edges of the ribbon. Any of the chemistries recited above may also be used in a spray coating process. A particularly preferred spray coating process is one which uses mono butyl tin trichloride, ethyl acetate and hydrogen fluoride to deposit a fluorine doped tin oxide coating.

A further type of know process is combustion chemical vapour deposition (CCVD) process in which a vapour or liquid is burnt in aflame positioned adjacent to the surface to be coated. Again the chemistries recited above may be used in a CCVD process. In a CCVD process the precursor is decomposed in the flame which means that precursors which are not useful in an APCVD process such as tin acetate or zinc acetate may be useful. CCVD processes may also be more effective than APCVD processes when the temperature of the glass is relatively low.

A further type of coating process which can be used to coat the edges of the glass ribbon is a sol gel coating process. In a sol gel process a liquid vehicle is coated on to the surface and then heated so as to evaporate solvent and form a coating.

The thickness of the edge coating will typically be in the range 5 to 500 nm more usually in the range 100 to 300 nm.

These processes may be used to coat the edges of the glass whilst it is passing through the float bath but preferably they are used to coat the glass in the lehr gap i.e. whilst the ribbon is passing from the float bath to the annealing lehr or in the lehr bath itself. When the coated glass has passed through the lehr the coated edges are cut off and discarded. The quality of the coating which is applied to the edges is not critical and variations in its uniformity will not generally affect the performance of the process. Similarly the visible light transmission at the coated edges of the glass ribbon may be less then that of the coated glass at the centre of the ribbon.

The processes of the present invention find particular application in the production of coated glass products where the thickness of the glass ribbon is at least 8 mm and most particularly where the thickness of the glass is at least 10 mm. The invention enables coated glasses of this thickness and especially low e coated glasses to be produced on line in a float glass processes with less breakages in the ribbon.

The invention claimed is:

1. A process for the production of a coated glass ribbon as part of a float glass production process which comprises the steps of forming a heated glass ribbon, depositing a first transparent conductive coating upon a major surface of the glass ribbon which does not extend to the edges of the glass ribbon whilst the glass ribbon is in a float bath portion of the float glass production process, depositing a second transparent coating on the uncoated edges of the glass ribbon after the glass ribbon has emerged from the float bath portion and whilst the edges are at a temperature which is above the ambient temperature, cooling said coated glass ribbon under controlled conditions in an annealing lehr and cutting off the edges of the glass ribbon so as to produce a glass ribbon having a uniform coating extending across the full width of the cut glass ribbon.

2. The process according to claim 1, wherein the ribbon has a thickness of at least 8 mm.

3. The process according to claim 2, wherein the first transparent coating has a thickness in the range of from 10 nm to 500 nm.

4. The process according to claim 1, wherein the first transparent conductive coating is deposited in the float bath using a chemical vapour deposition process.

5. The process according to claim 1, wherein the second coating is applied to the edges of the glass ribbon and the temperature of the ribbon is at least 300° C.

6. The process according to claim 5, wherein the temperature of the ribbon is in the range 500° C. to 600° C.

7. The process according to claim 1, wherein the second coating is applied to the glass ribbon in the gap between the float bath and the annealing lehr.

8. The process according to claim 1, wherein the second coating is applied using a pyrolytic spray deposition process.

9. The process according to claim 1, wherein the second coating is applied using a chemical vapour deposition process.

10. The process according to claim 1, wherein the second coating is applied using a combustion chemical vapour deposition process.

11. The process according to claim 1, wherein the first transparent coating is a low emissivity coating in which $\epsilon<1$.

12. The process according to claim 11, wherein the emissivity of that portion of the glass coated with the first conductive coating is substantially the same as the emissivity of that portion of the glass which is coated with the second conductive coating.

13. The process according to claim 11, wherein the emissivity of the second conductive coating is in the range 0.2 to 0.7.

14. The process according to claim 1, wherein the second conductive coating comprises a tin oxide.

15. The process according to claim 14, wherein the second conductive coating comprises a fluorine doped tin oxide.

* * * * *